W. W. WHITFORD.
PIPE CONSTRUCTION.
APPLICATION FILED SEPT. 11, 1917.

1,302,744.

Patented May 6, 1919.

Inventor
Wilbur W. Whitford
By his Attorney
Edward A. Jarvis

UNITED STATES PATENT OFFICE.

WILBUR W. WHITFORD, OF NEW YORK, N. Y.

PIPE CONSTRUCTION.

1,302,744.    Specification of Letters Patent.    Patented May 6, 1919.

Application filed September 11, 1917. Serial No. 190,716.

*To all whom it may concern:*

Be it known that I, WILBUR W. WHITFORD, a citizen of the United States of America, residing at Port Richmond, county and borough of Richmond and city and State of New York, have invented certain new and useful Improvements in Pipe Construction, of which the following is a full, clear, and exact description.

This invention relates to an improvement in pipe or conduit construction, the object of which is to produce an inexpensive durable and effective conduit or pipe for the conveyance of water, steam or other liquid or gaseous elements. My improved pipe is especially well adapted for leaders for houses as it will outlast a metal leader besides being far cheaper.

To produce a pipe, I employ a plurality of layers or plies of any flexible substance, such as tar-paper, rubberoid and the like, and reinforce same, that is to say, apply a stiffening element, said element being preferably placed between the layers or plies of the flexible substance referred to, special means being employed to connect the ends after the structure has been formed into a cylinder or pipe. A more detailed description will be hereinafter given, reference being had to the accompanying drawing, wherein.

Figure 1:
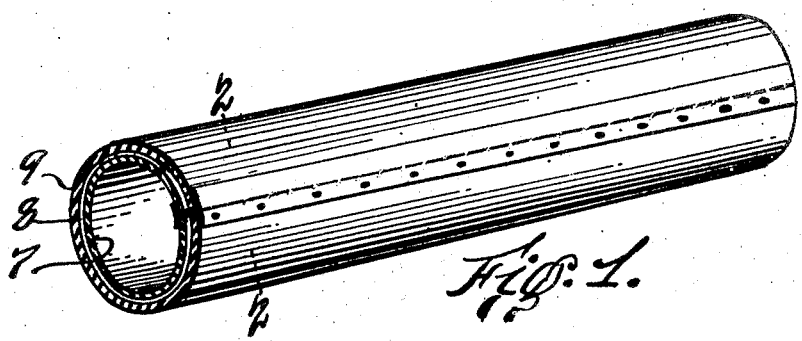
Figure 1 is a perspective view illustrating my invention.
Figure 2:
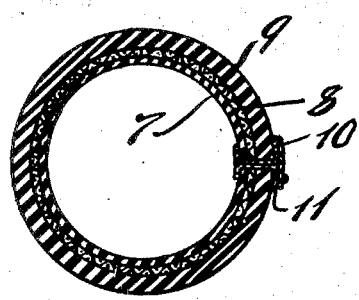
Fig. 2 is an enlarged cross-sectional view thereof, the section being taken on a line 2—2 in Fig. 1.
Figure 3:
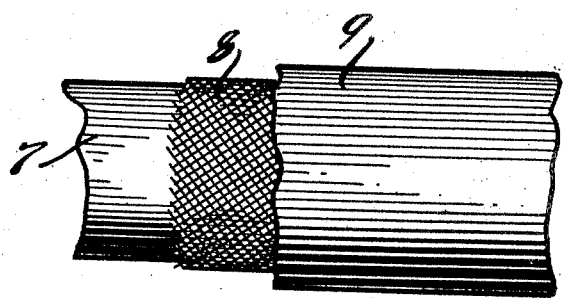
Fig. 3 is an enlarged fragmentary side view illustrating the several layers of the structure.

A pipe made in accordance with my improvement consists of an inner ply 7 and outer ply 8 an intermediate ply 9 and connecting devices 10 and 11. The inner and outer plies consist of any pliable or flexible material, such as waterproofed fabric or rubberoid, preferably the latter. One of the objects of my invention is to form a pipe out of sheet material formed into a tube, over a form, if desirable.

To prepare the structure for formation into a tube or pipe, I place a sheet or section of some relatively stiff material, such as wire cloth or metal netting, indicated by 8, upon a sheet of some pliable water proof substance such as tar paper, rubberoid or water proofed fabric indicated by 7. I then place a layer of similar material upon the layer 8, the latter layer being indicated by 9.

Figure 4:
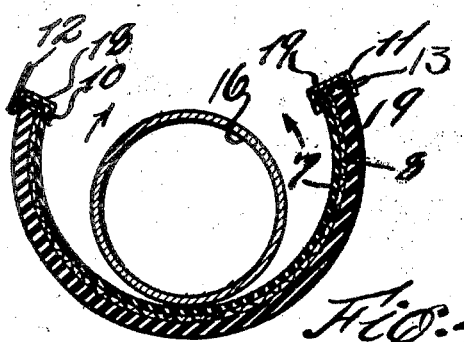
Fig. 4 is a diagrammatic sectional view illustrating one way to form a pipe or conduit.
Figure 5:
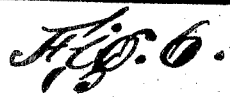
Fig. 5 is an enlarged fragmentary sectional view illustrating the several layers of the structure and also one of the connecting members.

After having performed the above operations, I place along the side edges of the assemblage metal channel shaped strips indicated by 10 and 11, one of the strips, such as 10, carries a flange 12, the other rivets 13 to enter the openings 14 in the flange 12. Both the strips 10 and 11 are riveted to their respective edges of the combination of layers by rivets 15 (see Fig. 5). After the blank, which may be of any desired length, has been formed as above set forth, I bend same over a form indicated by 16 Fig. 4, into tubular form, causing the rivets 13 to enter the openings 14 in the flange 12 of the connecting strip 10, after which the rivets are headed the form 16 can now be withdrawn. One of the chief objects of the invention is to form a pipe out of reinforced pliable material which is wrapped around a form to form a pipe or tube. My improved structure does not require any power pressing heating or machinery to produce it, it consists merely of superposed layers or plies of pliable material having a reinforcement therebetween, the main object of the invention being to provide an inexpensive tubular conduit.

The material out of which the body of the pipe or tube is formed, can be obtained in the form of sheets, and cut to the proper length and width.

Figure 6:
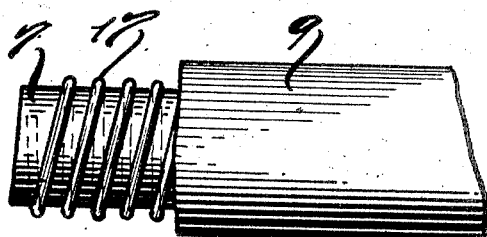
Fig. 6 is a side elevation of a modified form of pipe construction.

Instead of reinforcing the tube by wire screen, I may employ wire, wound into the form of a spiral as indicated by 17 Fig. 6, to which the outer layer 9 can be applied and also the inner layer 7. Before the connecting strips 10 and 11 are brought together, I may apply cement or water-proof paint to the surfaces 18 and 19 of the connections 10 and 11 respectively to insure a perfect water tight connection.

What I claim is:

1. A pipe consisting of a sheet of pliable material formed into a cylindrical shape, connecting strips carried by the sheet along the side edges thereof, means to connect said strips after the pipe is formed, and means to stiffen the circularly formed sheet.

2. A pipe consisting of a plurality of superimposed sheets of pliable material, a reinforcing element located between said sheets, a channel strip located along the adjacent edges of said superimposed sheets, a flange carried by one of said strips provided with openings, and means carried by the other of said strips to engage the openings in said flange to maintain the structure in circular form, the channeled portion of said strips having inserted therein the said edges of the superimposed sheets.

3. A pipe consisting of a sheet of pliable material formed into cylindrical shape, metallic connecting strips carried by the sheet along the side edges thereof, and means to secure the metallic strips one to the other to maintain the pipe in cylindrical form.

Signed at New York city, N. Y., this 30th day of August, 1917.

WILBUR W. WHITFORD.